United States Patent
Halford

(10) Patent No.: US 12,423,647 B2
(45) Date of Patent: Sep. 23, 2025

(54) SYSTEM AND METHOD FOR INK INVENTORY REDUCTION

(71) Applicant: X-RITE INCORPORATED, Grand Rapids, MI (US)

(72) Inventor: Chris Halford, Lowell, MI (US)

(73) Assignee: X-RITE INCORPORATED, Grand Rapids, MI (US)

( * ) Notice: Subject to any disclaimer, the term of this patent is extended or adjusted under 35 U.S.C. 154(b) by 786 days.

(21) Appl. No.: 17/291,492

(22) PCT Filed: Nov. 6, 2019

(86) PCT No.: PCT/IB2019/059526
§ 371 (c)(1),
(2) Date: May 5, 2021

(87) PCT Pub. No.: WO2020/095220
PCT Pub. Date: May 14, 2020

(65) Prior Publication Data
US 2022/0004953 A1   Jan. 6, 2022

Related U.S. Application Data

(60) Provisional application No. 62/756,351, filed on Nov. 6, 2018.

(51) Int. Cl.
*G06Q 10/087*   (2023.01)
*G01J 3/46*   (2006.01)
(Continued)

(52) U.S. Cl.
CPC ............ *G06Q 10/087* (2013.01); *G01J 3/463* (2013.01); *G06K 15/4075* (2013.01);
(Continued)

(58) Field of Classification Search
CPC .. G06K 15/4075; H04N 1/00477; H04N 1/54; H04N 1/6052; G06Q 10/06315
See application file for complete search history.

(56) References Cited

U.S. PATENT DOCUMENTS

| | | | |
|---|---|---|---|
| 2007/0263249 A1 | 11/2007 | Rich et al. | |
| 2012/0086959 A1* | 4/2012 | Wu | H04N 1/6022 358/1.9 |

(Continued)

FOREIGN PATENT DOCUMENTS

| | | |
|---|---|---|
| EP | 1152322 | 11/2001 |
| WO | 2010056739 | 5/2010 |

OTHER PUBLICATIONS

International Search Report regarding PCT/IB2019/059526, mailed Jan. 8, 2020 (4pgs.).

(Continued)

*Primary Examiner* — Akwasi M Sarpong
*Assistant Examiner* — Michael L Burleson
(74) *Attorney, Agent, or Firm* — Hahn Loeser & Parks, LLP

(57) ABSTRACT

A multi-factor method of optimizing a quantity of inks in a spot color ink inventory associated with an ink inventory management system is provided. An electronic device performs the steps of: importing a first set of spot color data from the ink stock management system, setting a color tolerance, obtaining color differences between spectral information of pairs of color references in the first set of spot color data, identifying color references meeting a first replacement factor of having a color difference within tolerance of another color reference, designating a second color reference as a replacement for a first color reference if at least one second replacement factor is met, and exporting a second set of spot color data including the designated replacement reference colors. The step of obtaining color (Continued)

differences may comprise calculating a color difference value ΔE between pairs of color references.

20 Claims, 7 Drawing Sheets

(51) Int. Cl.
    *G06F 3/0482*     (2013.01)
    *G06K 15/00*     (2006.01)
    *G06Q 30/0601*     (2023.01)
    *H04N 1/00*     (2006.01)
    *H04N 1/54*     (2006.01)
    *H04N 1/60*     (2006.01)

(52) U.S. Cl.
    CPC ..... *G06Q 30/0633* (2013.01); *H04N 1/00477* (2013.01); *H04N 1/54* (2013.01); *H04N 1/6052* (2013.01); *G06F 3/0482* (2013.01)

(56) References Cited

U.S. PATENT DOCUMENTS

2017/0253063 A1\*   9/2017   Schuppan .......... G06Q 30/0283
2018/0034998 A1     2/2018   Pancik et al.

OTHER PUBLICATIONS

Written Opinion of the International Searching Authority regarding PCT/IB2019/059526, mailed Jan. 8, 2020 (6pgs.).

EPO Examination Report regarding EP 19 804 857.1, dated Apr. 19, 2023 (4 pgs.).

\* cited by examiner

SYSTEM AND METHOD FOR INK INVENTORY REDUCTION

The present application is a National Stage entry of International Patent Application serial number PCT/IB2019/059526, filed Nov. 6, 2019, entitled "SYSTEM AND METHOD FOR INK INVENTORY REDUCTION," currently pending; which claims the benefit of U.S. Provisional Application No. 62/756,351, filed Nov. 6, 2018, entitled "SYSTEM AND METHOD FOR INK INVENTORY REDUCTION". All of the applications and the patents are incorporated herein by reference, including their specifications.

BACKGROUND

Over time a print shop's or printing company's ink inventory may become large and may need to be monitored and culled. The process of supplementing an ink inventory with inks, for example pure or mixed inks, or "spot" colors, without a method for duplicate detection and removal of duplicate or near-duplicate spot colors, may induce a problem where visually-redundant color matches are built up, each at a variety of cost. For example, it is problematic for ink vendors to properly manage a large inventory of spot color inks, and multiple ink mixing recipes render leftover ink difficult to use, leading to waste. It is therefore desired to reduce inventory without visual impact to a print shop's customers' products, ideally with a reduction in overall cost. In a more general sense, a company that manufactures products comprising inks, paints, dyes, or mixes of inks, paints, or dyes, may wish to reduce the number of inks, paints, or dyes it holds in inventory to satisfy the largest number of colored products requests from its customers at the lowest cost.

SUMMARY

A multi-factor method of optimizing a quantity of inks in a spot color ink inventory associated with an ink inventory management system is provided. The ink inventory may be represented by a first set of spot color data comprising a plurality of color references, each color reference comprising at least color identification information, spectral information and ink cost information, the ink cost information including ink usage over a predetermined period of time. An electronic device having a processor may execute a set of instructions to perform the steps of: importing a first set of spot color data from the ink stock management system, setting a color tolerance, obtaining color differences between the spectral information of pairs of color references in the first set of spot color data, identifying color references meeting a first replacement factor of having a color difference within tolerance of another color reference, designating a second color reference as a replacement for a first color reference if at least one second replacement factor is met, and exporting a second set of spot color data including the designated replacement reference colors. The step of obtaining color differences may comprise calculating a color difference value $\Delta E$ between pairs of color references.

In one example, the at least one second replacement factor comprises comparative ink costs, and the second color reference has a lower ink cost than the first color reference. In this example, the step of designating as a replacement further comprises selecting a color reference having a highest ink cost and comparing the spectral information for that color reference with the spectral information of color references having lower ink costs. The method may further comprise iterating the designating as a replacement step through the color references in the first set of spot color data.

In another example, the at least one second replacement factor comprises a quantity of color references that are within the color tolerance of a color reference, and the second color reference has a higher quantity of color references within tolerance compared to the first color reference. In this example, the designating as a replacement step further comprises: creating a plurality of centroids, each centroid having a centroid color corresponding to a color reference from the first set of spot color data; grouping centroids in clusters that have centroid colors having a color difference from each other that is within the color tolerance; ranking clusters based on the quantity of centroids assigned to each cluster; for centroids assigned to more than one cluster, re-assigning the centroid from one or more clusters having a lower ranking to a cluster within the color tolerance and having a higher ranking; and for each cluster having at least one assigned centroid, designating the cluster's centroid color as a replacement for the assigned centroid color. This example may further comprise the steps of: identifying orphan centroids comprising a centroid not being assigned to a cluster; and reassigning one or more centroids that are within the color tolerance of the orphan centroids from a cluster to the orphan centroid, thereby forming a new cluster. This example may further comprise reassigning one or more centroids from one or more higher ranking clusters to one or more lower ranking clusters having a lower color difference. The second replacement factor may further comprise a third replacement factor, the third replacement factor comprising comparative ink costs, the method further comprising reassigning one or more centroids to one or more clusters having centroid colors within the color tolerance and having lower ink costs.

In another example, the method may further comprise accepting at least one replacement color reference to replace a color reference from the first set of spot color data such that the second set of spot color data has fewer color references than the first set of spot color data. The second set of color spot data may be exported to the ink stock management system.

In another example, the replacing step further comprises the step of providing a user interface comprising: a display of the first color reference and the proposed replacement second color reference positioned adjacently at a same elevation; a display of estimated cost savings of replacing the first color reference with the second color reference; and one or more of a user-activated button to accept replacing the first color reference with the second color reference or a user-activated button to decline replacing the first color reference with the second color reference. The user interface may further comprise a display listing duplicate and near-duplicate color references within a color difference tolerance. The user interface may further comprise a display listing color references lacking ink cost information.

In another example, a print shop computer system is provided. The print shop computer system may comprise an ink stock management system and an ink inventory rationalization system. The ink stock management system may comprise a first set of spot color data comprising a plurality of color references, each color reference comprising at least color identification information, spectral information, and ink cost information, the ink cost information including ink usage over a predetermined period of time. The ink inventory rationalization system may comprise a non-volatile storage medium, and one or more processors, wherein the non-volatile storage medium stores a set of instructions which, when executed by the one or more processors, causes the computer system to perform the steps comprising: importing the first set of spot color data from the ink stock management system; setting a color tolerance; obtaining color differences between the spectral information for pairs of the color references in the first set of spot color data; identifying color references meeting a first replacement factor of having a color difference within tolerance of a second color reference; designating a second color reference as a replacement for a first color reference if at least one second replacement factor is met; and exporting a second set of spot color data including the replacement reference colors to the ink stock management system.

The computer system may further comprise a purchase order management system, wherein the purchase order management system is configured to access the second set of spot color data. The computer system may further comprise a data bus, wherein the ink stock management system and the ink inventory rationalization system are coupled to the data bus.

In another example, the computer system further comprises a purchase order management system and a data bus. The ink stock management system, the ink inventory rationalization system and purchase order management system are coupled to the data bus, and the ink stock management system and the purchase order management system have access to the second set of spot color data over the data bus. In another example, the computer system further comprises at least one printing line, wherein the ink inventory rationalization system is updated with real-time ink usage information from the printing line.

BRIEF DESCRIPTION OF DRAWINGS

Various embodiments in accordance with the present disclosure will be described with reference to the drawings, in which.

DETAILED DESCRIPTION

Ink inventory rationalization broadly comprises several steps, including data import and clean-up, color matching, cost reduction analysis, and ink replacement.

Figure 1:
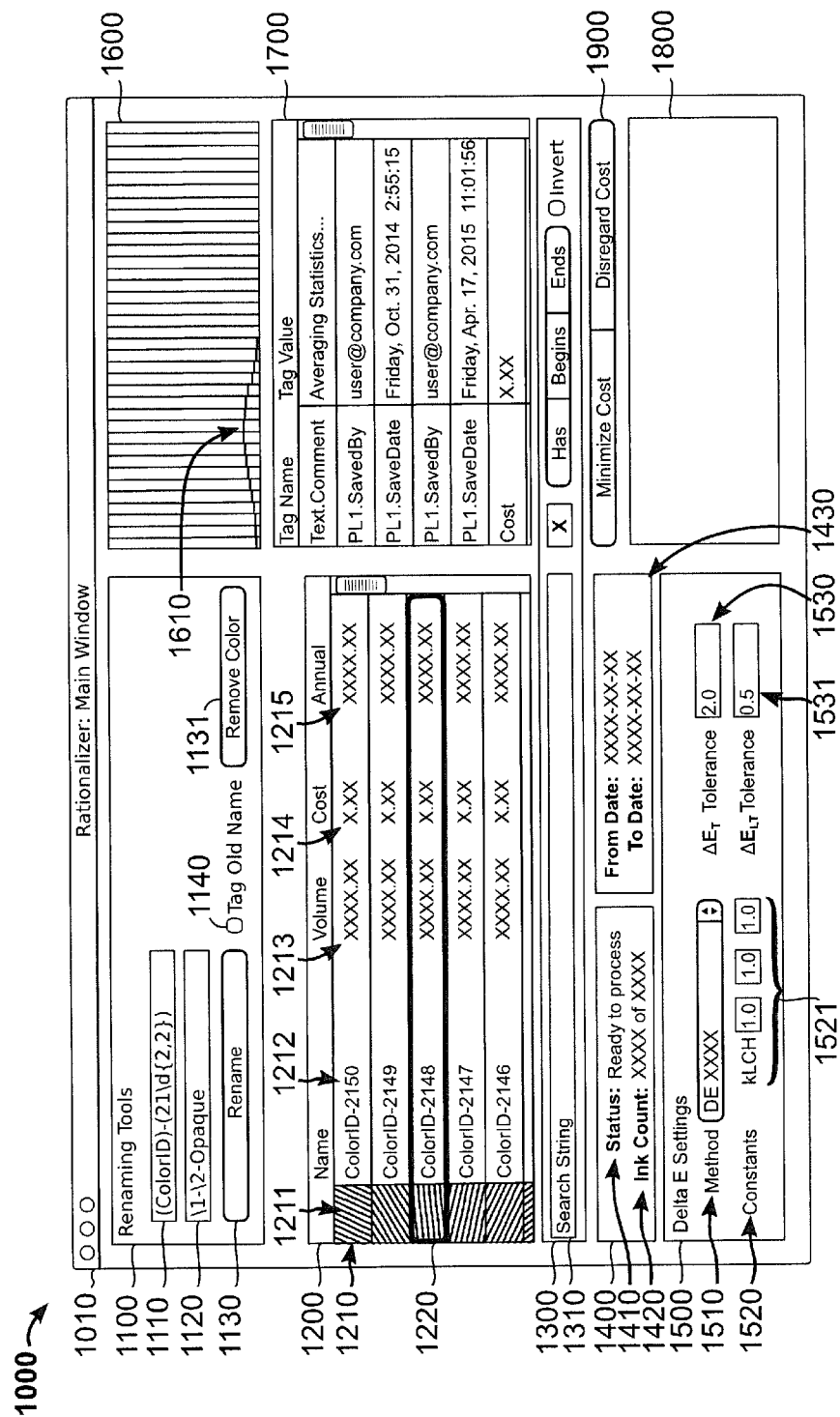
FIG. 1 is a graphical user interface (GUI) for a Data Import Utility Interface according to one embodiment of an Ink Rationalizer System.

FIG. 1 illustrates a graphical Data Import Utility Interface 1010 according to one embodiment of an Ink Rationalizer System 1000. The Data Import Utility Interface 1010 may be provided by locally installed software, or may be presented in a web browser from a cloud-based service, or any other suitable means for producing a graphical user interface. The Data Import Utility Interface 1010 may be used to import L*a*b* or spectral color definitions, or a list of ink references into the Ink Rationalizer 1000. Color data may be imported from different types of commonly used formats, for example color exchange or color communication formats, including CxF3, MIF, XTF, etc. Multiple databases of color may be appended.

Data refinement may be required, for example to remove duplicates or near-duplicates within a color difference tolerance to cull the list of inks in inventory, or to rename inks held in inventory. To accomplish this, the Data Import Utility Interface 1010 includes a Renaming Tool pane 1100, further comprising a Search Pattern Input Field 1110, a Replacement String Input Field 1120, a Rename Tool Button 1130, and a Remove Color Button 1131. A user may use a simple search or more powerful regular expression search to search, rename, or replace one or more color names or metadata. The Search Pattern Input Field 1110 and Replacement String Input Field 1120 provide the ability to quickly identify and edit colors that have ambiguous or duplicate names. A user may select Tag Old Name Checkbox 1140 to retain prior name in metadata.

The Data Import Utility Interface 1010 further comprises an Ink Listing Pane 1200. The user may use this utility to identify and correct color records that have ambiguities, for example ambiguous names, or otherwise cannot be properly processed, for example records that lack one or more of volume or cost information. The Data Import Utility Interface 1010 may provide the user one or more choices of: manually correct or remove records, for example ambiguous records; semi-automatically correcting or removing records using computer-provided suggestions inferred from comparisons with records within, for example, a predefined color difference range; or automatically correcting or removing ambiguous or incomplete records. The Ink Listing Pane 1200 has a table including an Ink Selection Row 1210, Simulated Color Swatch Column 1211, Color Name Column 1212, Annual Volume Column 1213, Ink Cost Column 1214, and Annualized Ink Cost Column 1215. This provides the ability to review and confirm imported cost and volume usage. A Search Pane 1300 including a Search Input Field 1310 is provided to search for one or more color records.

For a Selected Ink Row 1220, a Status Pane 1400, a Spectral Reflectance Curve 1610 (that may be presented within a Spectrum Visualization Pane 1600), and a Color Record Metadata Pane 1700 are provided. The Status Pane 1400 includes an Ink Status Field 1410 and an Ink Count Field 1420. The Ink Status Field 1410 indicates whether a selected color record has been validated by the user or by the Ink Rationalizer System 1000 and is ready for rationalization by the Ink Rationalizer System 1000. These records 1220, 1610, 1220, 1410, 1420, 1700 may be saved, for example on a non-volatile memory device 5304, for recall by the user, by the Ink Rationalizer System 1000, or by a system in communication with the Ink Rationalizer System 1000.

Once data is validated, the Ink Rationalizer System 1000 may execute one or more rationalization methods 6000, 6010, 7000, 9000. A rationalization method may for example be a colorimetric rationalization method, for example controlled through specification of a color difference tolerance, also called $\Delta E_T$. The colorimetric rationalization method may include specifying constants, for example a maximum color difference tolerance. A user may specify constants or parameters, or monitor variables, through a Rationalization Specification Pane 1500. The Rationalization Specification Pane 1500 may include a Method Selector Button 1510, one or more Constants Fields 1520, one or more Constants Input Fields 1521, one or more Colorimetric Tolerance Input Fields 1530, and one or more Library Colorimetric Tolerance Input Fields 1531. The Method Selector Button 1510, may allow, for example, for the selection of a $\Delta E$ rationalization method, for example based on one or more of CIEDE2000, CIE94, CIE76, or "CMC 1:c". Constants Input Fields 1521 may allow for the specification of constants for a color space, such as L*a*b or L*c*h. The Colorimetric Tolerance Input Field 1530 allows for the specification of a tolerance $\Delta E_T$ corresponding to the method specified by Method Selector Button 1510. The Library Colorimetric Tolerance Input Field 1531 may enable the Ink Rationalizer System 1000 to, for one or more colors displayable in the Ink Listing Pane 1200, find a replacement color within a color library, for example a standard color library, for example a Pantone Matching System library, within a Library Color Tolerance value $\Delta E_{LT}$ 8100$_{LT}$ (illustrated in FIG. 10A).

The ink replacement step may include one or more ink replacement methods. A first embodiment for an ink replacement method may be an exclusive ink replacement method. A second embodiment for an ink replacement method may be a non-exclusive ink replacement method. Exclusive replacement means that once replaced, an ink, as defined by its color attribute, may not be replaced by another ink, as defined by another color attribute. Non-exclusive replacement means that an ink, for example replaced by a less expensive ink, may remain in the inventory, for example to replace an even more expensive ink.

Figure 11:
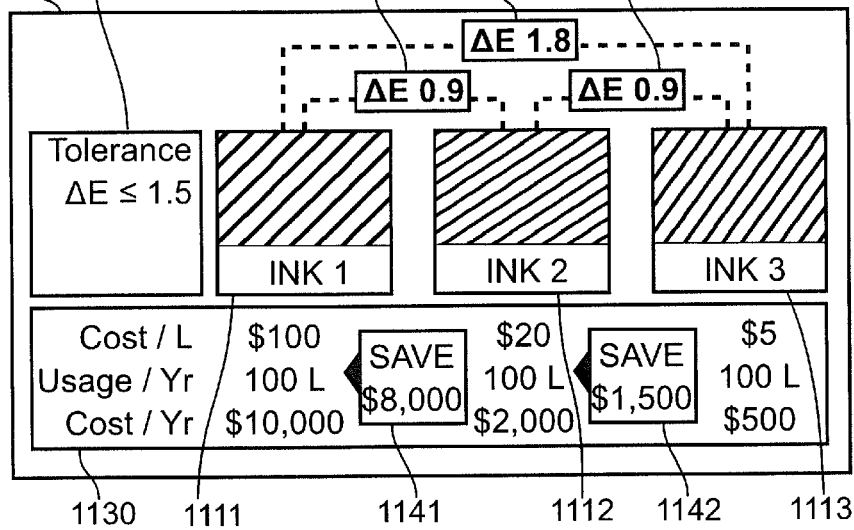
FIG. 11 is an embodiment for an ink replacement graphical user interface.

FIG. 11 presents an embodiment for an ink replacement graphical user interface (GUI) 1100 for the one or more ink replacement methods, for example an exclusive or a non-exclusive ink replacement method. The ink replacement GUI 1100 may, for example, present a plurality of color patches, for example patches for a first color 1111, a second color 1112, and a third color 1113. Each color patch may comprise a color name field or a field to select or provide one or more color-related information, for example, supplier references, formulation recipe, color values in one or more color spaces, usage volume, or cost. The ink replacement GUI 1100 may, for example, comprise a color tolerance selector or information box 1120 and present color difference information 1121, 1122, 1123, between pairs of color patches. The ink replacement GUI 1100 may comprise an information pane 1130 presenting one or more cost or usage information, for example cost per volume, usage per time period, cost per time period, for each of the one or more of the plurality of color patches, for example for the first, second, and third colors. The ink replacement GUI 1100 may comprise one or more advisory boxes 1141, 1142, for example boxes that may be selected by the user to execute the advice, for example that may advise the user of savings if a first color is replaced by a second color. A user of the ink replacement GUI 1100 may visualize, for example in advisory box 1142 located between a second and a third color information, that the second color 1112 may be replaced by the third color 1113 and result in annual savings of $1,500. The user may select the advisory box 1142 to execute the replacement. A user of the ink replacement GUI 1100 may visualize, for example in advisory box 1141 located between a first color information and the second color information, that the second color may not be eliminated from inventory because it may be used to replace the first color and induce annual savings of $8,000. The user may select one or more of the advisory boxes 1141, 1142 to execute the advised replacement. A user of the ink replacement GUI 1100 may visualize, for example, why with a color tolerance 1120 of 1.5, a color difference 1123 of 1.8 may prevent a first color 1111 from being replaced by a third color 1113.

Figure 2A:
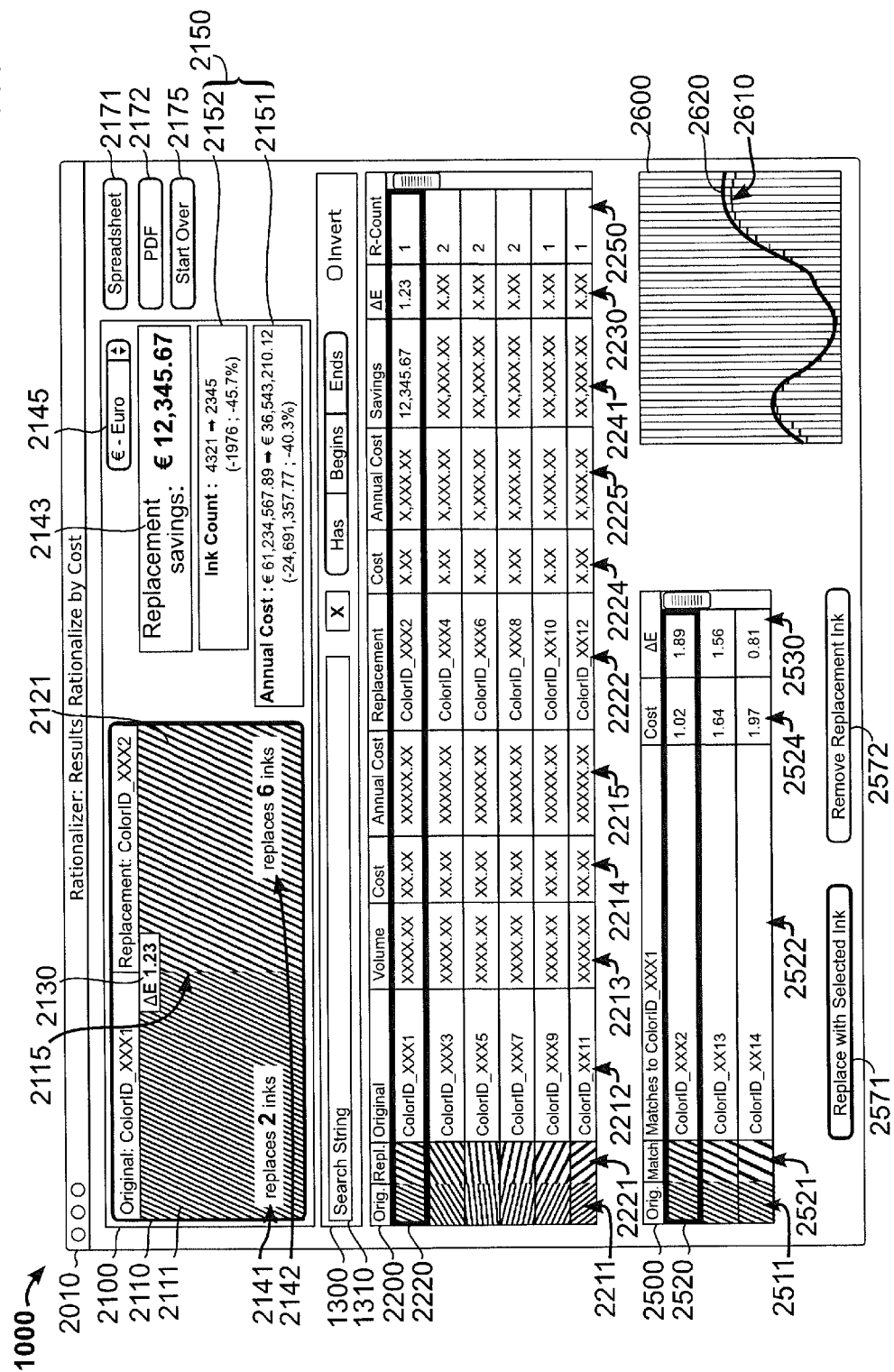
FIG. 2A is a GUI for a Rationalize by Cost Replacement Selection Utility Interface.

Brand logos or other information may be displayed in pane 1800. Utility Selector Box 1900 may be used for selecting between more than one ink replacement utility. For example, in the example illustrated in FIG. 1, Utility Selector Box 1900 is selectable between Minimize Cost, which may invoke the Rationalize by Cost Replacement Selection Utility Interface 2010 illustrated in FIG. 2A, and Disregard Cost, which may invoke the Rationalize by Color Replacement Selection Utility Interface 2020 illustrated in FIG. 2B.

Rationalize by Cost Replacement Selection Utility Interface 2010 includes a Replacement Information Box 2100, which further comprises a Color Comparison Box 2110 including an Original Color Simulation 2111 and a Replacement Color Simulation 2121, for example positioned adjacently with original color-to-replacement color contact border 2115, for example positioned along an axis that is parallel to a plane passing through the user's eyes, for example enabling viewing at a same elevation angle for both eyes, to allow a visual color comparison. The Replacement Information Box 2100 may also include information displays, such as a $\Delta E$ Display 2130 providing a numerical difference of the colors, and Inks Replaced Information Boxes 2141 and 2142, which provide the number of inks replaced by the Original Color and the Replacement Color, respectively.

Savings Information Box 2143 provides an estimated savings that may be realized by making the replacement proposed in the Replacement Information Box 2100. The Savings Information Box 2143 may provide estimated savings over a period of time, for example one year. Savings Information Box 2143 may provide estimated savings for one or more inks, for example a plurality of ink records 2220 selected, for example all ink records. The currency for Savings Information Box 2143 may be selected via Currency Selector 2145, which may comprise a pull-down menu. Information Box 2150 may include an Annual Cost Information Box 2151 and a Quantities of Recipes Information Box 2152. To make the information available in other applications and/or reports, Export Spreadsheet Button 2171, PDF Button 2172 and Start Over Button 2175 may be provided. The Export Spreadsheet Button may cause the system to export a detailed spreadsheet breakdown listing of a plurality or all of one or more of: replacements; colors which cannot be replaced within tolerance; financial information; and colorimetric information for all listed colors. The spreadsheet or database electronic document may be in one or more of commonly used data formats, for example XLS or its variants, Open Document Format or its variants, comma separated values or its variants, XML, or a relational database management system format, for example that can be imported by a database management system, for example MySQL. The exported data may enable a user to further analyze or process the database, for example using a purchase order management system. The Ink Rationalizer System 1000 may be queried for data by a remote system, for example a purchase order management system.

A Rationalization Results Interface 2200 is also illustrated. This interface may include one or more Selected Record 2220, for example selected by the user, and a plurality of non-selected records. The records may be presented in a format corresponding to that of an editable spreadsheet. Each record may include one or more of the following fields: Simulated Original Color 2211, Simulated Replacement Color 2221, Original Ink Name Field 2212, Original Ink Volume Field 2213, Original Ink Cost Field 2214, Original Ink Annual Cost Field 2215, Replacement Ink Name Field 2222, Replacement Ink Cost Field 2224, Replacement Ink Annual Cost Field 2225, ΔE Field 2230, Replacement Ink Annual Savings Field 2241, and Replacement Count Field 2250.

A Manual Match Selection Interface 2500 may also be provided to display alternate replacement options with reduced cost savings, but increased visual agreement, for example expressed by lower color difference values ΔE, and allow override of the cost-optimized replacement candidates. The Manual Match Selection Interface 2500 may include one or more records including a Selected Record 2520, a Simulated Original Color 2511, a Simulated Replacement Color 2521, a Matching Ink Name Field 2522, a Matching Ink Cost Field 2524, a Matching Ink ΔE Field 2530, a Replace Ink Button 2571 and a Remove Replacement Ink Button 2572. A Spectral Comparison Pane 2600 may also be provided, including a Spectral Histogram 2610 and a Spectral Curve 2620.

Figure 2B:
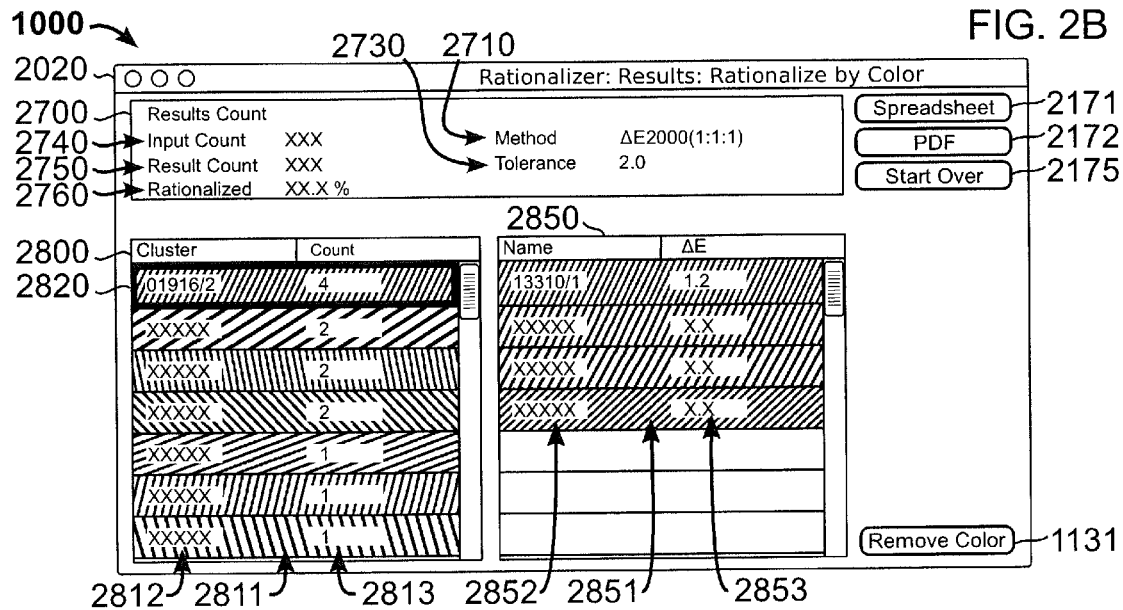
FIG. 2B is a GUI for a Rationalize by Color Replacement Selection Utility Interface.

The Rationalize by Color Replacement Selection Utility Interface 2020 is illustrated in FIG. 2B. This interface includes Results Pane 2700 and Color Cluster Pane 2800. Results Pane 2700 includes information displays, such as Rationalization Method 2710, Rationalization Tolerance 2730, Input Count 2740, Result Count 2750, and Percentage Rationalized 2760. Input Count 2740 reflects the total number of original colors input to the Rationalize by Color Replacement Selection Utility Interface 2020, and Result Count 2750 reflects the total number of colors remaining after rationalization.

As explained in more detail below with respect to FIGS. 8A-8D and 9A-9B, the method of rationalization by replacement color involves a method of clustering similar colors, for example colors within a color difference tolerance, around a replacement color. Color Cluster Pane 2800 allows for inspection of the replacement color and each original color included in that replacement color's cluster, including visual and numerical comparisons. The Color Cluster Pane 2800 includes a plurality of clusters, including a Selected Color Cluster 2820. For each of the displayed clusters, the following fields may be displayed: a Simulated Cluster Color 2811, a Cluster ID 2812, and a Cluster Count 2813 (e.g., number of colors in the cluster). The Cluster ID may also be referred to herein as a "centroid."

A Cluster Comparison Pane 2850 may provide information regarding the Selected Color Cluster 2820 including, for each color in the cluster, a Simulation of Clustered Color 2851, a Clustered Color Name Field 2852, and a ΔE of Clustered Color to Replacement Color Field 2853.

To make the information available in other applications and/or reports, Export Spreadsheet Button 2171, PDF Button 2172 and Start Over Button 2175 may be provided. A Remove Color Button 1131 may also be provided to manually remove a color from a cluster.

Figure 3:
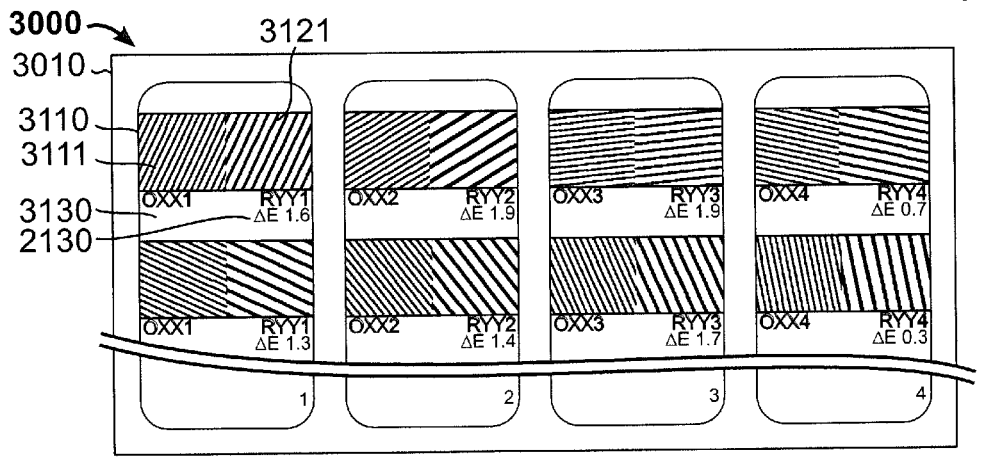
FIG. 3 is an embodiment of an Exported Results Visualization.

The Ink Rationalizer System 1000 may comprise a method to generate an embodiment of an Exported Results Visualization 3000. For example, a user may select the PDF Button 2172 and the Ink Rationalizer System 1000 may generate an Exported Results Visualization 3000 comprising visual and numerical comparisons of cluster colors may be generated. An example of this is illustrated in FIG. 3. The Exported Results Visualization 3000 may comprise an Exported Results Document 3010, for example in Portable Document Format (PDF) or in an Extensible Markup Language (XML), including one or more Result Groups 3110, each Result Group 3110 having a Replaced Color 3111 and a Replacement Color 3121 for side-by-side visual comparisons, and ΔE information 2130 for numerical comparisons. Reference numbers/names for the colors may also be provided, for example in an information box 3130.

Figure 4:
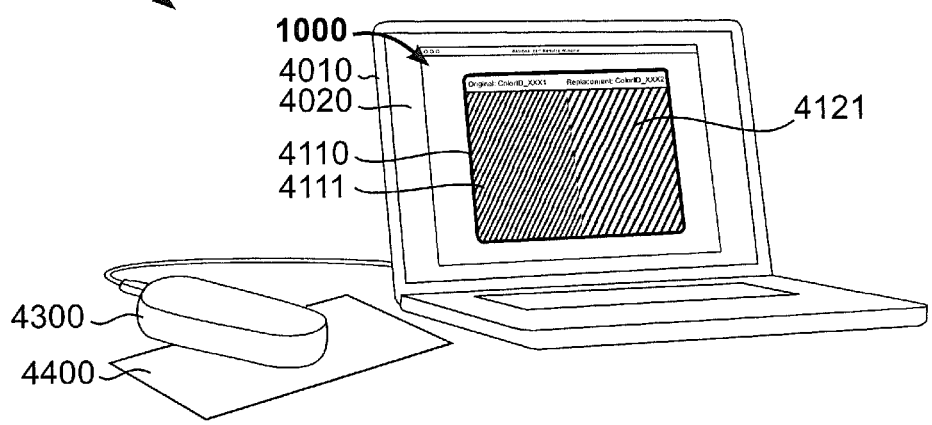
FIG. 4 is a perspective view of an embodiment of a Color Acquisition and Rationalized Color Database Visualization System.

FIG. 4 illustrates a Color Acquisition and Rationalized Color Database Visualization System 4000 enabling a print shop to quickly show a customer how an order that has its price cut thanks to rationalization might appear. The system 4000 may for example be a computing device 4000, for example a laptop or mobile computing device 4010, and may comprise a graphical display 4020, for example a liquid crystal display (LCD) or a light emitting diodes (LED or OLED)-based display. A customer may have a sample or a portion of a sample 4400, for example a printed sample, scanned using a colorimeter or other color or appearance measuring device 4300. An appearance measuring device may provide more than color measurement data, for example multi-angle measurement data, texture data, translucence data, gloss, or sparkle data. An appearance measuring device may for example enable a user to use the Ink Rationalizer System 1000 to relate ink colors to, for example, textile materials, plastics, lacquered coatings, or coatings comprising effect pigments. The print shop, or a user at the print shop, may use the Ink Rationalizer System 1000 to evaluate how the customer's color requests, for example one or more colors measured with the measuring device 4300, fit within the overall print shop's rationalized color output, for example evaluate how the customer's color requests may increase or decrease the print shop's costs, for example ink costs, over a time period, for example one year. The user may then propose to the customer to visualize replacement colors, for example overall or one-by-one less expensive colors, in a large dialog pane 4110 that presents measured color 4111 next to proposed replacement color 4121. This dialog is an enlarged version of 2110 in FIG. 2A. Colors are shown side-by-side rather than one above the other to avoid color distortion caused by most LCD screens.

Figure 5:
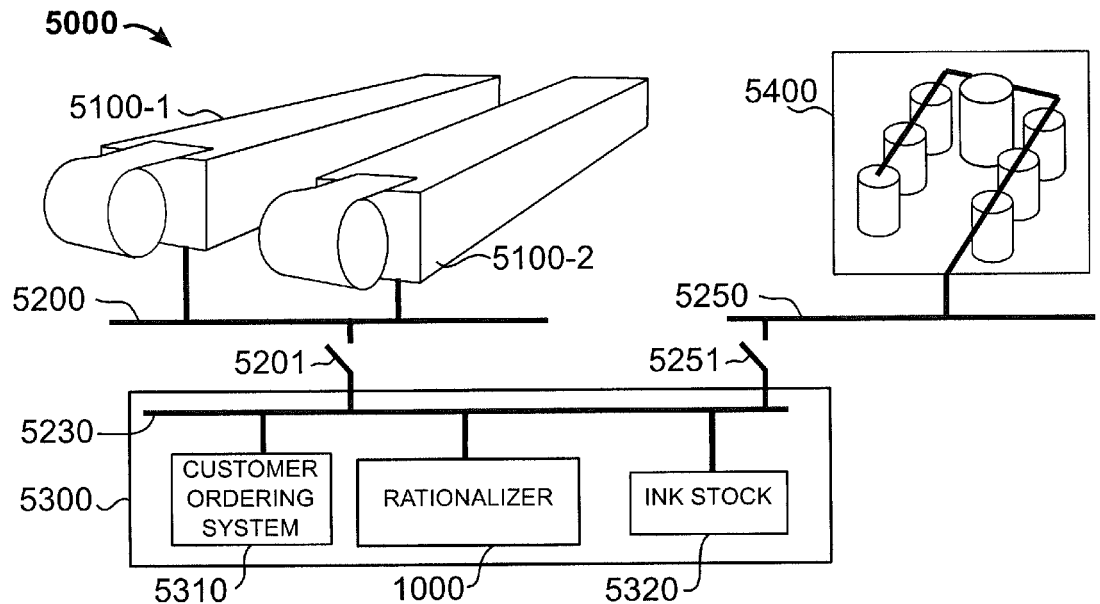
FIG. 5 is a schematic diagram of an embodiment of a print shop comprising an Ink Rationalizer System.

FIG. 5 illustrates components of a print shop 5000 that may contribute or exchange data for the color rationalization process or method 6000 (FIG. 6): a computer system 5300 that comprises a processor 5302 and a data bus 5230, for example an internal data bus, enabling data exchange between the rationalizer system 1000, a customer ordering system 5310, and an ink stock management system 5320. The computer system 5300 may connect to one or more printing lines 5100-1, 5100-2 via data bus 5200 to collect ink usage data in real-time to enable real-time updating of the rationalizer 1000. The computer system 5300 may also connect to one or more ink dispensers 5400 via data bus 5250 to collect further ink consumption data and ink supply data. Ink dispensers may be connected via pipes to the printing lines (not shown) and there may be ink losses and substantial amounts of ink stored in the pipes and ink mixers. Switches 5201 and 5251 symbolize that data bus connections are optional. For example, rationalizer data may be updated manually on a periodic basis. Data buses 5230, 5200, 5250 may be wireless. The Ink Rationalizer System 1000 may be comprised in a system (not shown) to manage a print shop 5000. For example, the Ink Rationalizer System 1000 may be comprised in a system to manage or reduce costs of all inventories or supplies, for example including paper supplies.

Figure 6:
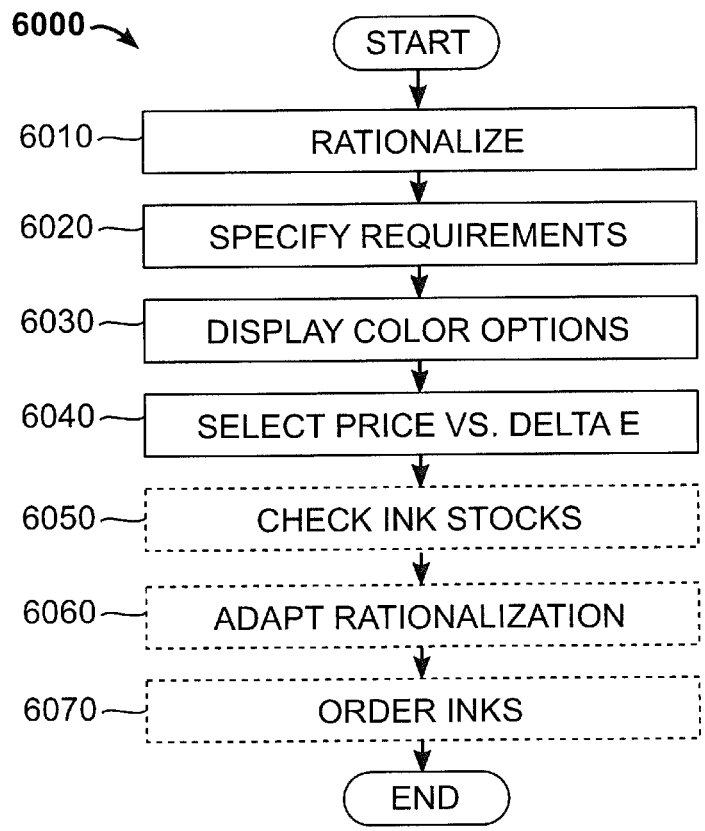
FIG. 6 is a flowchart for an embodiment of a rationalization method.

FIG. 6 illustrates a rationalization process or method 6000 workflow for usage of the rationalizer system 1000 within a print shop 5000. The rationalization process or method 6000 may be comprised in a method (not shown) to manage or reduce costs of all inventories or supplies, for example of a print shop 5000. The rationalization process or method 6000 may be called upon on a periodic basis or at every arrival of a customer order. At step 6010, for example as an initial step, the print shop may rationalize its inks, for example based on historical ink consumption data, for example over a period of one year, to form a current rationalization. A customer may then present a print job request and specify requirements at step 6020. The operator may then use the rationalizer system 1000 to display color options at step 6030 based on results of the current rationalization, for example proposing to the customer to use inks at lowest price as listed in the current rationalization, for example listed in the Cluster Comparison Pane 2850. At step 6040 the print shop may adjust the $\Delta E_T$ tolerance to form an adjusted $\Delta E_T$ tolerance and propose colors that are closer to the customer's requirement, possibly at a higher price. The proposed colors may for example be presented in the Cluster Comparison Pane 2850 or an embodiment of an Exported Results Visualization 3000. At step 6050, based on one or more of: a customer's order volume, for example provided by the customer ordering system 5310; a current job backlog, for example provided by the customer ordering system 5310; and ink stock data, for example provided by the ink stock management system 5320; the system may provide information regarding delivery time and adjusted project cost, for example based on the adjusted $\Delta E$ tolerance. At step 6060, the operator may, based on the customer's order volume and ink stock data, adjust the rationalization, for example by selecting lower or higher color difference tolerances on selected colors or color ranges, and offer a lower price. At step 6070, the rationalizer may order inks to be dispatched to the ink dispensers or order them from an ink manufacturer, for example through a data link to the ink manufacturer's ordering system.

Figure 7:
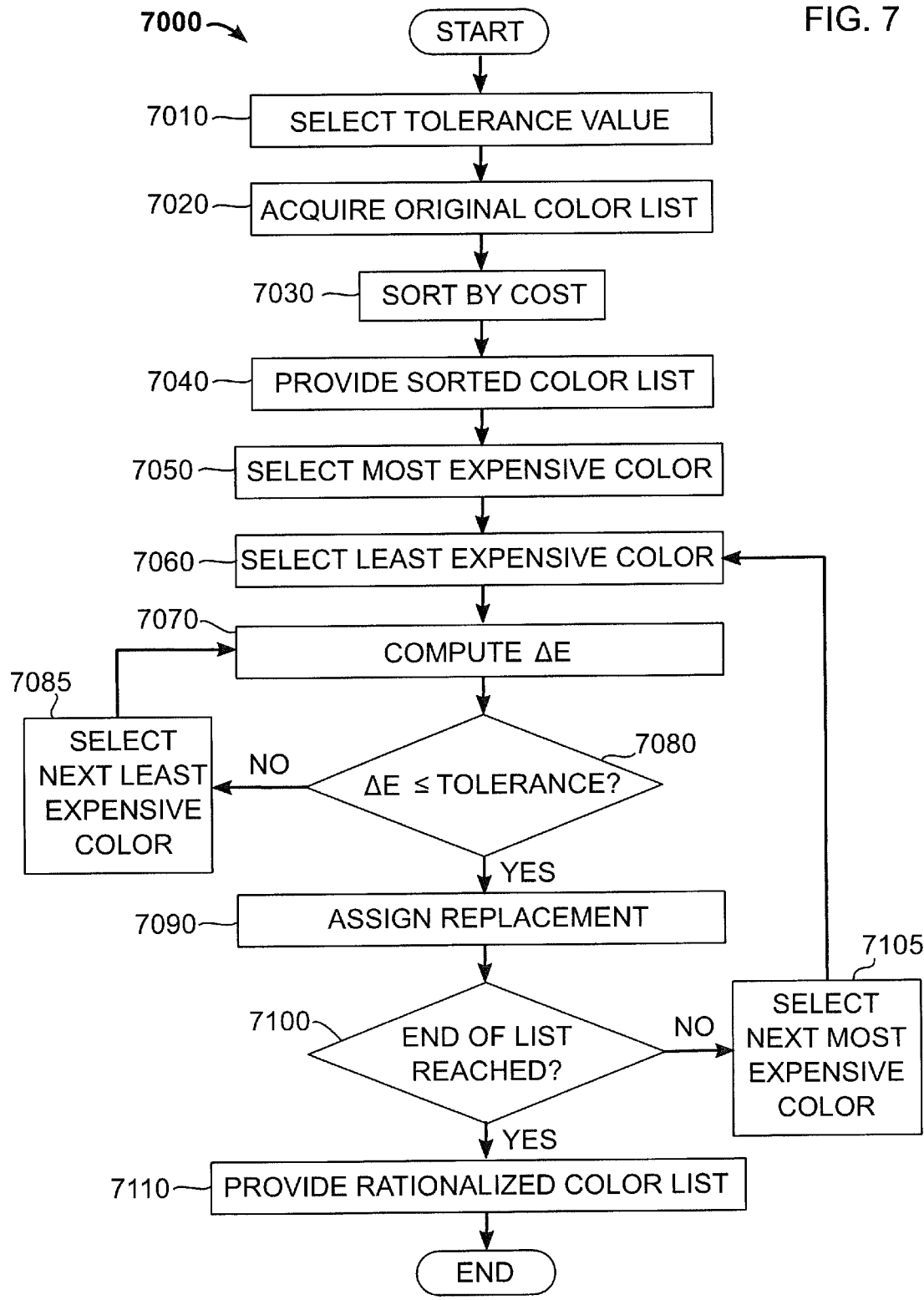
FIG. 7 is a flowchart for an embodiment of a computational process of an embodiment of a rationalization method.

FIG. 7 presents one example of a computation process for an embodiment of a rationalizing method 7000 used by the rationalizer system 1000. In step 7010, a color difference tolerance value is selected. In step 7020, an original color list is acquired. The original color list may, for example, comprise a portion or all of the list of inks held in stock by a print shop. The original color list may be transmitted to the rationalizer system 1000 by a data network. The original color list is sorted by cost in step 7030. The sorted color list is provided in step 7040. The sorted color list may, for example, be displayed in the Rationalization Results Interface 2200. The most expensive color is selected in step 7050 and the least expensive color is selected in step 7060. The color difference, $\Delta E$, of the two selected colors is compared in step 7070. In step 7080, it is determined whether the least expensive color selected in step 7060 is within the $\Delta E_T$ tolerance (selected in step 7010) of the most expensive color selected in step 7050. If the least expensive color is not within the $\Delta E_T$ tolerance, the next least expensive color is selected in step 7085 and the process returns to step 7070 to compute a new $\Delta E$ value. If the selected colors are within the $\Delta E_T$ tolerance, the least expensive color is assigned as a replacement to the most expensive color in step 7090. The process checks whether the end of the original color list has been reached in step 7100 and, if not, selects the next most expensive color in step 7105 and returns to step 7060. Once the end of the original color list is reached, a rationalized color list is provided in step 7110.

FIGS. 8A to 8D, and 10A, are cluster diagrams depicting the rationalization process for an embodiment of a rationalization method. With reference to FIGS. 8A-8D and 9A and 9B, another embodiment 9000 for a method for ink inventory rationalization involves a method for replacing color based on grouping, or using a clustering method, of similar colors. When clustering is complete, the centroid color of each cluster may be used to replace each member color of the cluster. In this example, each color in the original color list is used to define a centroid color for a cluster of colors. The cluster of colors includes all colors within a color difference tolerance (for example, $\Delta E_T=2.0$ or lower). The cluster diagrams 8A, 8B, 8C, 8D, 10A may, in some embodiments for an Ink Rationalizer System, be presented on a graphical display 4020 or on an Exported Results Document 3010.

Figure 8A:
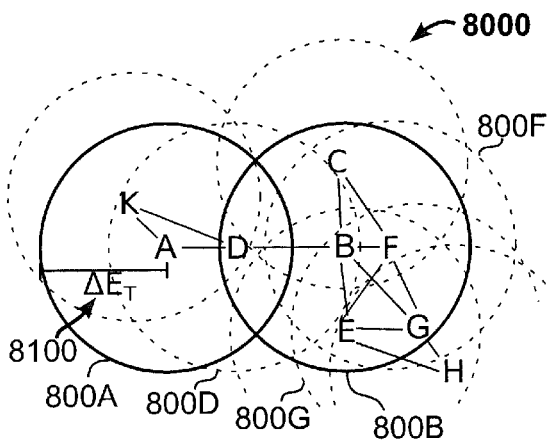
FIGS. 8A to 8D are cluster diagrams depicting the rationalization process for an embodiment of a rationalization method.
Figure 9A:
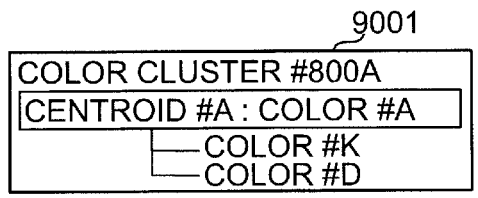
FIGS. 9A and 9B are a flowcharts for a cluster data unit and for steps of a rationalization method, respectively.

FIG. 9A presents an example representation for a cluster data unit 9001. The representation corresponds to that for cluster 800A (shown in FIG. 8A) with centroid A associated to color A and linked to colors K and D on the basis of being within the set color difference tolerance from centroid A. The cluster data unit 9001 may be represented as a data structure comprising: a cluster name, a centroid name, a centroid color, and one or more linked colors within a color difference tolerance. Although not illustrated, the cluster data unit 9001 may comprise further information, for example a cluster-specific color difference tolerance value, color difference values from the centroid color for each listed color, color costs, color volumes in stock, color ordering dates, color expiration dates, color age, color consumption per period of time, a list of customers known to make use of a given color, revenue induced per color, color viscosity, color solvent, color specific gravity, color compatible substrates, color spectral histogram, or other parameters relevant to ink formulation.

Referring to FIG. 8A, for example, color A is designated a centroid color of cluster A, and color B is a centroid color of cluster B. A centroid to which other centroids are linked is considered a cluster. Based on the color difference tolerance 1530, cluster A may include centroids A, D, and K as cluster members. Based on the color difference tolerance band, cluster B may include centroids B, C, D, E, F, and G as cluster members. The method for ink inventory rationalization 9000 (FIG. 9B) may comprise a step 9010 to search for ink colors, centroid candidates, or centroids, within a color difference tolerance. The step of assigning a centroid to a cluster may comprise linking a centroid, for example an ink color selected from a list of inks, to other centroid colors within a maximum color difference tolerance. The linking may for example be done by one or more of: selecting a centroid in an ordered list of centroids; computing the color difference $\Delta E$ between the selected centroid color and each of the other centroid colors in the list of centroids; and linking the selected centroid to each of the centroids within maximum color difference tolerance.

The number of inks kept in a print shop's inventory may be reduced when clusters of inks within a given color difference tolerance are identified or formed. Forming of ink clusters around a centroid color or ink color may enable a user of the Ink Rationalizer System 1000 to replace inks in that cluster by a centroid ink color. In some cases, for example an intermediate step of the method to cluster inks around one or more centroids, one or more clusters may comprise a large number of inks of the inventory whereas other clusters comprise fewer inks, thereby resulting in an imbalance in the number of members of a cluster from one ink cluster to another. The clustering method may comprise one or more steps to reduce the imbalance in the number of members of one or more clusters. An effect of the clustering method is that the distribution of centroid ink colors across a color gamut may provide a cost-efficient reduction in ink inventory to satisfy a print shop's ink needs or colored print production needs over a time period, for example one year. Clusters may be ranked by the quantity of cluster members or centroids assigned to the cluster.

Figure 8B:
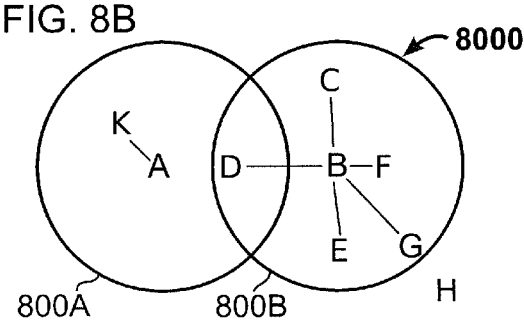

The method for ink inventory rationalization 9000 may comprise a disambiguation step 9020. In disambiguation step 9020, centroids that may be members of more than one cluster, for example due to the centroid cluster being within color difference tolerance of more than one cluster's centroid color, are re-assigned to the cluster having higher quantities of members. Re-assigning a centroid from one cluster to another may comprise unlinking the centroid from a cluster having lower quantities of members and linking the centroid to a higher-ranking cluster. For example, in FIG. 8B, cluster 800A has centroid A and, after clustering, initially has two members (D and K, shown in FIG. 8A). Cluster 800B has centroid B and preserves its initial five members (C, D, E, F and G). Color D is initially a member of cluster 800A and cluster 800B because it falls within color tolerance of both A and B. According to this clustering step's method, color D may be released from cluster 800A and assigned to cluster 800B to form the larger cluster 800B. This is illustrated in FIG. 8B by a line which links color D to color B, but not to color A, and described in FIG. 9B in the method's disambiguation step 9020. Centroid H remains as an orphan because it lies outside the maximum color difference tolerance for centroids A and B.

Describing the disambiguation step 9020 using social network analysis terminology: for each color (or centroid to which the color is associated) linkable to a plurality of centroids: unlink the color from centroids having fewer links—a centroid having fewer links may be said to be "lower-ranking"; and link the color to the centroid having the greatest number of links within maximum color difference tolerance—a centroid having the greatest number of links may be said to be "highest-ranking."

Figure 8C:
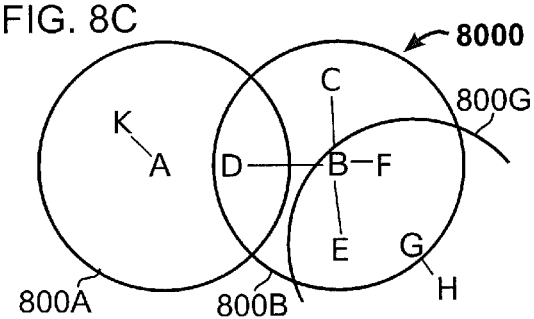

The disambiguation step 9020 may be repeated for each cluster, for example by analyzing the color difference of each color in a cluster, iterating for example from the cluster having the highest population of colors down to the cluster having the lowest population of colors. This repetition may further resolve remaining ambiguities. The list of clusters may be re-sorted after each iteration. Additionally, the list of clusters may be sorted from clusters having lowest population of colors to clusters having highest population of colors. Since clusters are represented by a centroid, this may correspond to sorting the list of centroids from lowest ranking to highest ranking The method for ink inventory rationalization 9000 may comprise an orphans removal step 9030. FIG. 8B illustrates the color H as being orphan. Color H is outside the tolerance band of color A and color B but within the tolerance of color G. To reduce the number of orphan colors resulting from the rationalization method, color H, which lies within the color tolerance of centroid G, may be assigned to centroid candidate G. Color H is therefore linked to color G, color G is unlinked from centroid B, and color G becomes the centroid of a cluster 800G. This is shown in FIG. 8C and described in FIG. 9B at step 9030.

Figure 8D:
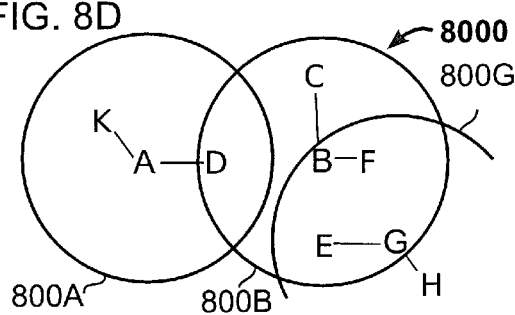

The method for ink inventory rationalization method 9000 may comprise a color difference optimization step 9040. In the color difference optimization step 9040, the clusters may lose or gain members so as to minimize one or more of: pairwise color differences, or an aggregate color difference value of each cluster or of the overall list of clusters. The aggregate color difference value may for example be an average of color difference values of a given cluster. The average may for example comprise one or more of: an arithmetic mean, a geometric mean, a median, or other methods to compute an average. Forming the aggregate color difference value may also comprise computing the variance of color differences or other methods for forming clusters, for example K-means or principal component analysis. For an example of pairwise color difference minimizing, in FIG. 8C, color D falls within the color tolerance band of both cluster 800A and cluster 800B. However, color D is closer to color A than to color B. In the present example, color D may be re-assigned to cluster 800A, even though it may have initially been assigned to the larger cluster 800B, as shown in FIG. 8D. The ink inventory rationalization method 9000 may provide closer color matches than clustering solely based on member count, at the potential downside of replacing fewer colors. FIG. 8D also shows that color E may be re-assigned to cluster 800G instead of cluster 800B.

The steps 9010, 9020, 9030, 9040 of the rationalization method 9000 have been described in relation to color difference as a cost function for the clustering and optimization. Other embodiments of the steps or the rationalization method 9000 may comprise using a combination of two or more of: financial cost, for example cost per volume or per inventory item of each ink; member count; or color difference. In yet other embodiments of the steps or the rationalization method 9000, centroids may be colors from a pre-existing color library, for example a Pantone Matching System library.

Each step 9010, 9020, 9030, 9040 of the rationalization method 9000 may be used independently as a partial rationalization method or a step of another rationalization method. A person skilled in the art will infer that combining steps, for example in the order described 9010, 9020, 9030, 9040, may provide an inventory list that may comprise fewer ink colors and greater cost savings than if fewer steps are used.

The ink rationalization system or method may work with one or more of: color name, spectral reflectance of drawdown or production sample, volume used, or cost per unit. The ink rationalization system or method may operate even if one or more ink recipes, for example ink recipes for inks that are formed from mixing of two or more inks, are not available. The ink rationalization system or method may comprise data, for example formulation data, to form a relation or cross-reference from an ink name, reference, or color to an ink formulation. The relation or cross-reference may for example be stored in a color data unit comprising one or more of the components of a cluster data unit 9001.

The Rationalizer System 1000 may comprise a method to graphically display one or more steps of the method for visualization by an operator. For example one or more of the steps 9010, 9020, 9030, 9040 may be represented graphically as in FIGS. 8A to 8D.

The Rationalizer System 1000 may comprise a method that includes forming a transfer list table enabling an operator to track how original colors are replaced in the set of clusters resulting from the rationalization. For example in relation to FIGS. 8A-8D, a transfer list table may be embodied as in Table 1.

TABLE 1

| Original Color | Replacement Color | ΔE |
|---|---|---|
| A | A | 0 |
| B | B | 0 |
| C | B | 1.2 |
| D | A | 1.1 |
| E | G | 1.3 |
| F | B | 0.8 |
| G | G | 0 |
| H | G | 0.6 |
| K | A | 1.0 |

Figure 9B:
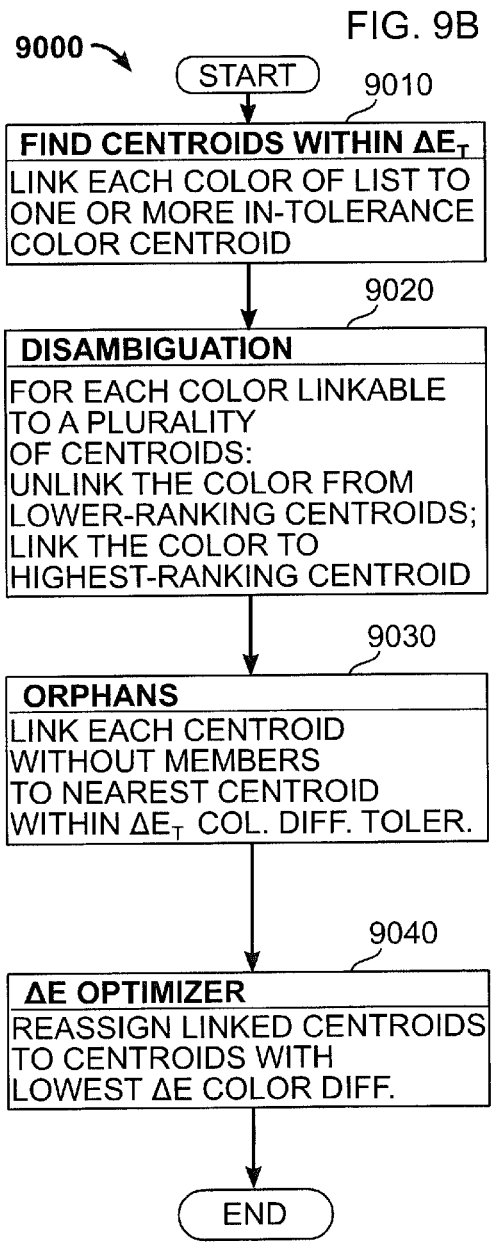

The Rationalizer System 1000 may comprise a method implemented as computer instructions. The instructions may be executed as an interpreted script or as a set of compiled instructions. The computer instructions may be stored on a non-volatile memory device 5304. An example of instructions for an embodiment of one or more methods of the Rationalizer System 1000, for example represented as a pseudo code embodiment of flowcharts of FIGS. 9A and 9B, is presented in Table 2 for an embodiment of data structures 9001 and in Table 3 for instructions as an embodiment of steps 9010, 9020, 9030, 9040. Comments in the pseudo code are prefixed with double slashes.

TABLE 2

```
class Color {
    string name;
    Spectrum spectrum;
}
class Cluster {
    Color centroid;
    list<Color> members;
}
list<Cluster> createClusters(list<Color> colors)
{
    list<Cluster> clusters;
    for (color in colors)
    {
        Cluster cluster;
        cluster.centroid = color;
        clusters.add(cluster);
    }
    return clusters;
}
```

TABLE 3

```
// Allow every centroid to become a member of any cluster
//where there is an in-tolerance dE from member to centroid
findCentroidsWithinDeltaE(list<Cluster> clusters)
{
    for (cluster in clusters)
    {
        for (otherCluster in clusters)
        {
            if (cluster != otherCluster) // ignore identity
            {
                dE = deltaE(cluster.centroid, otherCluster.centroid);
                if (dE < tolerance)
                {
                    cluster.members.add(otherCluster);
                }
            }
        }
    }
}
```

TABLE 3-continued

```
// Release any member (in other clusters) which is referenced in a cluster
with fewer members
disambiguate(list<Cluster> clusters)
{
    sortedClusters = sortByMemberCount(clusters); // most members first
    for (cluster in sortedClusters)
    {
        for (member in cluster.members)
        {
            // iterate through other referenced clusters
            parentclusters = buildParentClustersList(clusters, member);
            for (otherCluster in parentClusters)
            {
                if (cluster.members.count( ) < otherCluster.members.count( ))
                {
                    // remove member in other cluster
                    otherCluster.members.remove(member);
                }
            }
        }
    }
    // Noted variations:
    // - Can go from least to highest
    // - Can resort and repeat after each assignment rather than
    //   waiting to complete the entire cycle of all clusters
}
// handle centroids without members
orphans(list<Cluster> clusters)
{
    for (cluster in clusters)
    {
        // look for orphans
        if (cluster.members.count( ) == 0)
        {
            // it's an orphan
            for (otherCluster in clusters)
            {
                if (cluster != otherCluster) // ignore identity
                {
                    dE = deltaE(cluster.centroid, otherCluster.centroid);
                    if (dE < tolerance)
                    {
                        //Assign each orphan to a cluster where the dE
                        // of orphan to centroid is in tolerance (where
                        // possible)
                        cluster.members.add(otherCluster);
                    }
                }
            }
        }
    }
}
deltaEOptimizer(list<Cluster> clusters)
{
    for (cluster in clusters)
    {
        // reassign closest member only
        smallest_dE = max_val;
        for (member in cluster.members)
        {
            dE = deltaE(member, cluster.centroid);
            if (dE < smallest_dE)
            {
                smallest_dE = dE;
                memberWithSmallestdE = member;
            }
        }
        cluster.members.removeAll( );
        cluster.members.add(memberWithSmallestdE);
    }
}
main( )
{
    list<Color> allColors; // get it from database
    list<Cluster> clusters = createClusters(allColors);
    findCentroidsWithinDeltaE(clusters);
```

TABLE 3-continued

```
    disambiguate(clusters);
    orphans(clusters);
    deltaEOptimizer(clusters);
}
```

Figure 10A:
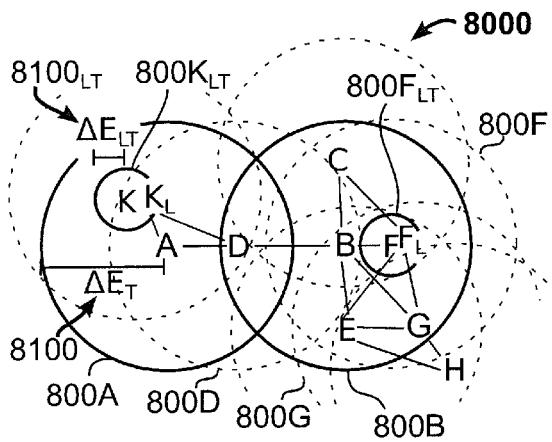
FIG. 10A is a cluster diagram for an embodiment of a Library Color Replacement method or step.

FIG. 10A presents an embodiment for a variation of the cluster representation of FIG. 8A. FIG. 10A illustrates a Library Color Replacement method 9005 (FIG. 10B) where one or more colors displayable in the Ink Listing Pane 1200 may find a replacement color selected within a color library within a Library Color Tolerance value $\Delta E_{LT}$ $8100_{LT}$. FIG. 10A illustrates the method where, for example, a color K from the Ink Listing Pane 1200 may be replaced by a color $K_L$ from the color library. Color $K_L$ may serve as a replacement for color K because it is within a Library Color Tolerance value $\Delta E_{LT}$ $8100_{LT}$ of color K, as illustrated by circle $800K_{LT}$. FIG. 10A also presents a second color F that is replaced by a color FL as illustrated by circle $800F_{LT}$. FIG. 10A also shows that one or more colors A, B, C, D, E, G, H are not replaced, for example because no suitable library color is within a Library Color Tolerance value $\Delta E_{LT}$. The Ink Rationalizer System 1000 may comprise one or more Library Color Tolerance values $\Delta E_{LT}$, for example, the tolerance may be different within one or more ranges of one or more of L, a, or b of Lab color space values than in other ranges of L, a, or b. Other color space values may be considered, for example from CIE XYZ, CMYK, RGB, or CIELCh color spaces.

Figure 10B:
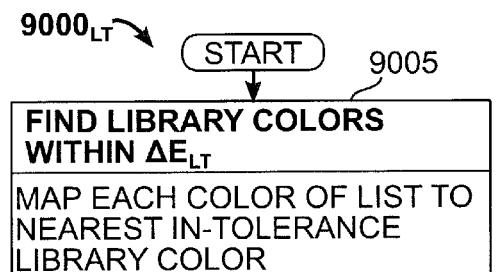
FIG. 10B is a flowchart for a Library Color Replacement method or step.

FIG. 10B presents a block diagram 9000LT for the Library Color Replacement method 9005. The Library Color Replacement method 9005 may, for each color of the list of colors displayable in the Ink Listing Pane 1200, search a replacement color selected within a color library within a Library Color Tolerance value $\Delta E_{LT}$ $8100_{LT}$, for example a color with the least color difference. The search and replace method 9005 may form a mapping from one or more colors of the colors displayable in the Ink Listing Pane 1200 to one or more colors of a color library, for example a Pantone Matching System library.

The Library Color Replacement method 9005 may be comprised as a step, for example an initial step, within the method for ink inventory rationalization 9000 (FIG. 9B). In an embodiment of the method for ink inventory rationalization 9000 comprising the Library Color Replacement method 9005 as a step prior to steps 9010, 9020, 9030, 9040, the color difference $\Delta E$ for each color displayable in the Ink Listing Pane 1200, for example each displayable color of a specified customer, is evaluated against one or more colors in one or more color libraries and the library color with the least color difference, also called the nearest, is selected to replace the displayable color. The output of step 9005 is a list of colors, for example with each color structured as a data unit 9001, that may comprise original displayable colors and replacement library colors. In some output lists, each original displayable color may have been replaced by a library color. The Library Color Replacement method 9005 may comprise a step (not shown) to remove duplicate colors from the output list. The output list may then be provided to one or more of steps 9010, 9020, 9030, 9040 for ink inventory rationalization.

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP stack protocols, FTP, SMB, OSI, HTTP-based protocols, SSL, Bitcoin, Ethereum, blockchain- or smart contracts-supported protocols. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self-organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores 5306 and other memory and storage media 5304 as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically or optically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices may also include one or more software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by one or more of the method, system, or device. Program modules, program components and/or programmatic objects may include computer-readable and/or computer-executable instructions, for example computer-executable instructions comprising a programmatic description of one or more of the methods, of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

Embodiments of the present disclosure, for example, one or more of the computing systems 5300, comprise or utilize a special purpose or general-purpose computer including computer hardware, such as, for example, one or more processors and system memory, as discussed in additional detail below. Embodiments within the scope of the present disclosure also include physical and other computer-readable media for carrying or storing computer-executable instructions and/or data structures. In particular, one or more of the processes or methods described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes or methods, including one or more of the processes or methods described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A digital communication interface, or network, is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
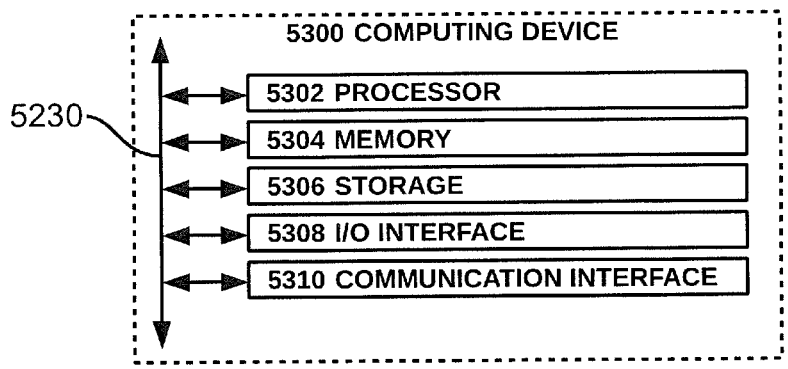
FIG. 12 is a block diagram of an exemplary computing device.

FIG. 12 illustrates a block diagram of an exemplary computing device 5300 that may be configured to perform one or more of the processes described above. One will appreciate that one or more computing devices, such as the computing device 5300 may host the one or more rationalization methods 6000, 6010, 7000, 9000. As shown by FIG. 12, the computing device 5300 can comprise a processor 5302, memory 5304, a storage device 5306, an I/O interface 5308, and a communication interface 5310, which may be communicatively coupled by way of a communication infrastructure 5312. While an exemplary computing device 5300 is shown in FIG. 12, the components illustrated in FIG. 12 are not intended to be limiting. Additional or alternative components may be used in other embodiments. Furthermore, in certain embodiments, the computing device 5300 can include fewer components than those shown in FIG. 12. Components of the computing device 5300 shown in FIG. 12 will now be described in additional detail.

In particular embodiments, processor(s) 5302 includes hardware for executing instructions, such as those making up a computer program. As an example and not by way of limitation, to execute instructions, processor(s) 5302 may retrieve (or fetch) the instructions from an internal register, an internal cache, memory 5304, or a storage device 5306 and decode and execute them. The computing device 5300 includes memory 5304, which is coupled to the processor(s) 5302. The memory 5304 may be used for storing data, metadata, and programs for execution by the processor(s). The memory 5304 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 5304 may be internal or distributed memory. The computing device 5300 includes a storage device 5306 includes storage for storing data or instructions. As an example and not by way of limitation, storage device 5306 can comprise a non-transitory storage medium described above. The storage device 5306 may include a hard disk drive (HDD), flash memory, a Universal Serial Bus (USB) drive or a combination these or other storage devices. The computing device 5300 also includes one or more input or output ("I/O") devices/interfaces 5308, which are provided to allow a user to provide input to (such as user strokes), receive output from, and otherwise transfer data to and from the computing device 5300. These I/O devices/interfaces 5308 may include a mouse, keypad or a keyboard, a touch screen, camera, optical scanner, network interface, modem, other known I/O devices or a combination of such I/O devices/interfaces 5308. The touch screen may be activated with a stylus or a finger. The I/O devices/interfaces 5308 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 5308 is configured to provide graphical data to a display for presentation to a user. The graphical data may be representative of one or more graphical user interfaces and/or any other graphical content as may serve a particular implementation. The computing device 5300 can further include a communication interface 5310. The communication interface 5310 can include hardware, software, or both. The communication interface 5310 can provide one or more interfaces for communication (such as, for example, packet-based communication) between the computing device and one or more other computing devices 5300 or one or more networks. As an example and not by way of limitation, communication interface 5310 may include a network interface controller (NIC) or network adapter for communicating with an Ethernet or other wire-based network or a wireless NIC (WNIC) or wireless adapter for communicating with a wireless network, such as a WI-FI. The computing device 5300 can further include a bus 5312. The bus 5312 can comprise hardware, software, or both that couples components of computing device 5300 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A multi-factor method of optimizing a quantity of inks in a spot color ink inventory associated with a spot color ink inventory management system with an electronic device having a processor executing a set of instructions to perform the steps comprising:
   importing a first set of spot color data from the spot color ink stock management system, the first set of spot color data comprising a plurality of color references, each color reference comprising at least color identification information, spectral information and ink cost information, the ink cost information including ink usage over a predetermined period of time;
   setting a color tolerance;
   obtaining color differences between the spectral information of pairs of color references in the first set of spot color data;
   identifying color references meeting a first replacement factor of having a color difference within tolerance of another color reference;
designating a second color reference as a replacement for a first color reference if at least one second replacement factor is met;
   exporting a second set of spot color data including the designated replacement reference colors;
   wherein the at least one second replacement factor comprises comparative ink costs, and the second color reference has a lower ink cost than the first color reference; and
   wherein the step of designating as a replacement further comprises selecting a color reference having a highest ink cost and comparing the spectral information for that color reference with the spectral information of color references having lower ink costs.

2. The method of claim 1, further comprising iterating the designating as a replacement step through the color references in the first set of spot color data.

3. The method of claim 1, wherein a color reference having a designated replacement cannot be designated as a replacement for another color reference.

4. The method of claim 1, wherein a color reference having a designated replacement may be designated as a replacement for a color reference having a higher ink cost.

5. The method of claim 1, wherein the at least one second replacement factor comprises a quantity of color references that are within the color tolerance of a color reference, and the second color reference has a higher quantity of color references within tolerance compared to the first color reference.

6. The method of claim 5, wherein the designating as a replacement step further comprises:
   creating a plurality of centroids, each centroid having a centroid color corresponding to a color reference from the first set of spot color data;
   grouping centroids in clusters that have centroid colors having a color difference from each other that is within the color tolerance;
   ranking clusters based on the quantity of centroids assigned to each cluster; for centroids assigned to more than one cluster, re-assigning the centroid from one or more clusters having a lower ranking to a cluster within the color tolerance and having a higher ranking; and
   for each cluster having at least one assigned centroid, designating the cluster's centroid color as a replacement for the assigned centroid color.

7. The method of claim 6, further comprising:
   identifying orphan centroids comprising a centroid not being assigned to a cluster; and
   reassigning one or more centroids that are within the color tolerance of the orphan centroids from a cluster to the orphan centroid, thereby forming a new cluster.

8. The method of claim 6, further comprising reassigning one or more centroids from one or more higher ranking clusters to one or more lower ranking clusters having a lower color difference.

9. The method of claim 6, wherein the second replacement factor further comprises a third replacement factor, the third replacement factor comprising comparative ink costs, the method further comprising reassigning one or more centroids to one or more clusters having centroid colors within the color tolerance and having lower ink costs.

10. The method of claim 1, further comprising accepting at least one replacement color reference to replace a color reference from the first set of spot color data such that the second set of spot color data has fewer color references than the first set of spot color data.

11. The method of claim 9, wherein the second set of color spot data is exported to the ink stock management system.

12. The method of claim 1, wherein the step of obtaining color differences comprises
   calculating a color difference value $\Delta E$ between pairs of color references.

13. The method of claim 1, wherein the replacing step further comprises the step of providing a user interface comprising:
   a display of the first color reference and the proposed replacement second color reference positioned adjacently at a same elevation;
   a display of estimated cost savings of replacing the first color reference with the second color reference; and
   one or more of a user-activated button to accept replacing the first color reference with the second color reference or a user-activated button to decline replacing the first color reference with the second color reference.

14. The method of claim 13, wherein the user interface further comprises a display listing duplicate and near-duplicate color references within a color difference tolerance.

15. The method of claim 13, wherein the user interface further comprises a display listing color references lacking ink cost information.

16. A print shop computer system, comprising:
   spot color ink stock management system, the spot color ink stock management system comprising a first set of spot color data comprising a plurality of color references, each color reference comprising at least color identification information, spectral information, and ink cost information, the ink cost information including ink usage over a predetermined period of time;
   at least one printing line, wherein the spot color ink inventory rationalization system is updated with real-time ink usage information from the printing line;
   a spot color ink inventory rationalization system comprising a non-volatile storage medium, and
   one or more processors, wherein the non-volatile storage medium stores a set of instructions which, when executed by the one or more processors, causes the computer system to perform the steps comprising:

importing the first set of spot color data from the ink stock management system;

setting a color tolerance;

obtaining color differences between the spectral information for pairs of the color references in the first set of spot color data;

identifying color references meeting a first replacement factor of having a color difference within tolerance of a second color reference;

designating a second color reference as a replacement for a first color reference if at least one second replacement factor is met; and exporting a second set of spot color data including the replacement reference colors to the spot color ink stock management system.

17. The computer system of claim 16, further comprising a purchase order management system, wherein the purchase order management system is configured to access the second set of spot color data.

18. The computer system of claim 16, further comprising a data bus, wherein the spot color ink stock management system and the spot color ink inventory rationalization system are coupled to the data bus.

19. The computer system of claim 16, further comprising:

a purchase order management system; and a data bus;

wherein the spot color ink stock management system, the spot color ink inventory rationalization system and purchase order management system are coupled to the data bus; and wherein the spot color ink stock management system and the purchase order management system have access to the second set of spot color data over the data bus.

20. A multi-factor method of optimizing a quantity of inks in a spot color ink inventory associated with a spot color ink inventory management system with an electronic device having a processor executing a set of instructions to perform the steps comprising:

importing a first set of spot color data from the spot color ink stock management system, the first set of spot color data comprising a plurality of color references, each color reference comprising at least color identification information, spectral information and ink cost information, the ink cost information including ink usage over a predetermined period of time;

setting a color tolerance;

obtaining color differences between the spectral information of pairs of color references in the first set of spot color data;

identifying color references meeting a first replacement factor of having a color difference within tolerance of another color reference;

designating a second color reference as a replacement for a first color reference if at least one second replacement factor is met;

exporting a second set of spot color data including the designated replacement reference colors; and accepting at least one replacement color reference to replace a color reference from the first set of spot color data such that the second set of spot color data has fewer color references than the first set of spot color data.

* * * * *